United States Patent

[11] 3,599,729

| [72] | Inventor | Ralph J. Greemore<br>Route 5, Box 173, Vincennes, Ind. 47591 |
|---|---|---|
| [21] | Appl. No. | 836,301 |
| [22] | Filed | June 25, 1969 |
| [45] | Patented | Aug. 17, 1971 |

[54] CULTIVATOR SHANK AND DISC SETTER
5 Claims, 3 Drawing Figs.

| [52] | U.S. Cl. | 172/741 |
|---|---|---|
| [51] | Int. Cl. | A01b 23/00 |
| [50] | Field of Search | 172/741 |

[56] References Cited
UNITED STATES PATENTS

| 332,563 | 12/1885 | Scott | 172/741 X |
|---|---|---|---|
| 2,070,155 | 2/1937 | Day | 172/741 X |
| 3,220,488 | 11/1965 | Becker | 172/741 X |

FOREIGN PATENTS

| 923,280 | 2/1955 | Germany | 172/741 |
|---|---|---|---|

*Primary Examiner*—Robert E. Pulfrey
*Assistant Examiner*—Clifford D. Crowder
*Attorneys*—Clarence A. O'Brien and Harvey B. Jacobson

ABSTRACT: An apparatus for use on a cultivator comprises a support clamp mounting on elongated bar to which an earth working element is affixed. The support element also mounts a spring biased pin between a locked position wherein the pin engages an indentation in the bar to lock the latter in a fixed position and a nonlocked position wherein said pin is free of said bar and the latter may be slid longitudinally relative to the support clamp to adjust the position of the earth-working element.

PATENTED AUG 17 1971  3,599,729

INVENTOR
Ralph J. Greemore

CULTIVATOR SHANK AND DISC SETTER

When using cultivators, it is necessary to adjust the position of the earth working implement, whether it be a shovel or disc hiller, according to the spacing of the rows of the plants to be cultivated. For example, the row spacing for beans and corn may be different so that after one type of plant has been cultivated, it may be necessary to adjust the shanks or disc hillers closer to one another or further apart depending on the spacing of another type of plant. Heretofore, such adjustment has been accomplished by loosening screws or bolts to loosen a clamp, sliding the shank or disc-hiller to a new position, and thereafter tightening the screws or bolts. This often was a burdensome and time consuming task. In the case where bolts were used, the wrench would sometimes slip off of the bolt head no nut resulting in injury to the hand. In other cases, the bolts or nuts become misplaced or lost.

According to the present invention, the aforesaid disadvantages are overcome by providing cultivator shank and disc adjustment apparatus which does not employ any screws or nuts and bolts to effect the adjustment. An adjustment is made merely by temporarily pulling out a spring biased pin from a locking to a nonlocking position to release a bar on which the shank or disc is mounted. The bar is then easily adjusted to a new position and the pin is released, whereby a spring urges it into its locked position to lock the bar in place.

Numerous other features and advantages of the invention will be apparent as it is better understood from the following description, which, taken in connection with the accompanying drawings, disclosed a preferred embodiment thereof.

Figure 1:
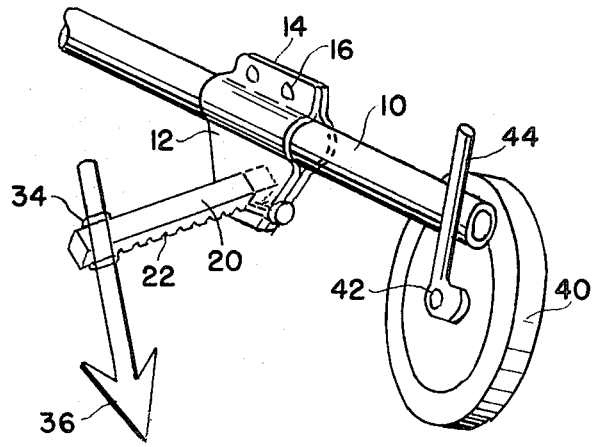
FIG. 1 is a perspective view of a cultivator shank and disc setter according to one embodiment of the invention.

Referring to the drawings, FIG. 1 shows a cultivator shank and disc setter comprising an elongated pipe 10 on which a casting 12 is mounted. The casting 12 has a cylindrical opening adapted to accommodate the pipe 10 and a pair of flat flanges 14 are provided above the cylindrical opening thereby to provide a split ring attachment means for attaching the casting 12 to the pipe 10. Accordingly, it will be readily apparent that the bolts 16 may be tightened to clamp and firmly secure the casting on the pipe 10.

Figure 2:
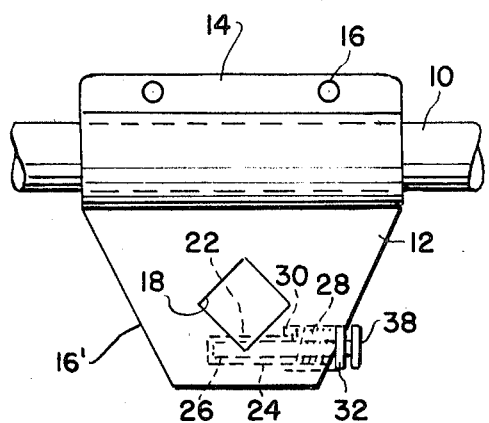
FIG. 2 is a partial side view thereof with the shovel not shown.
Figure 3:
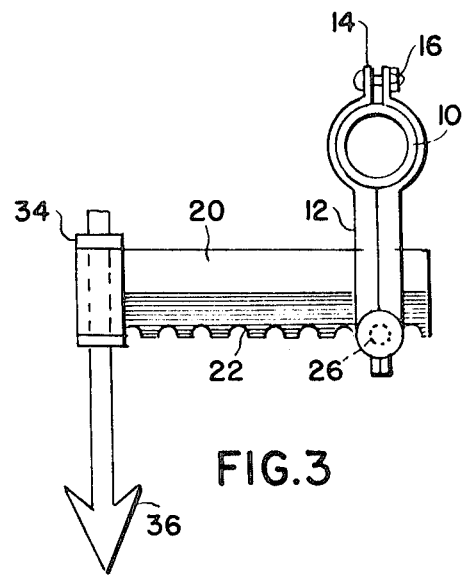
FIG. 3 is a partial end view of FIG. 1 with the guage wheel not shown.

The casting 12 has a downwardly depending support section 16 having a square opening 18 (FIG. 2) therein adapted to receive a square bar 20. The bar 29 is arranged with opposing corners vertically and horizontally disposed as will be readily apparent in the drawings The lower corner of the bar 20 is provided with a plurality of spaced notches 22 which may have a semicircular configuration as shown in the drawings.

The support section 16' of the casting 12 also has an elongated opening 24 having its longitudinal axis extending transversely of the elongated bar 20. Mounted in said opening 24 is a pin 26 which is biased towards the left, as viewed in FIG. 2, by a coil spring 28 which encircles the pin 26. To this end, the pin 26 has a washer 30 affixed thereto against which the end of the coil spring 28 bears to urge the pin 26 inwardly. The other longitudinal end of the spring 28 bears against a washer type part 32 which is fixed to the casting 12.

The inner end section of the pin 26 may have a circular cross section having a diameter corresponding to the diameter of the semicircular notches 22 so that said inner section of the pin 26 may be accommodated in said semicircular notches 22 for reasons to be explained.

The end portion of the bar 20 has mounted thereon a shank 34 having a shovel 36 adapted to cultivate the earth. In this regard, it is pointed out that on cultivators, shanks are provided with either shovels or disc hillers which are spaced according to the spacing of the rows of corn or beans or whatever plants are being cultivated. Accordingly, when cultivating one type of plant, the shanks may be set for one particular spacing, but when it is desired to cultivate another type of plant, the row spacing may be different and the shanks have to be reset by moving them closer together or further apart.

According to the present invention, the shanks may easily be reset very simply, merely by pulling out on the knob 38 of pin 26 until the latter disengages itself from the notch 22 in the bar 20. After such disengagement, the bar 20 may be slid longitudinally in the square opening 18 in casting 22 to any new desired position whereupon, the pin 26 is released and the spring 28 will urge the pin 26 to the left until it matches with a notch 22 thereby to lock the bar 29 in its new position. Of course, the bar 20 may have to be slid slightly one way or the other in a final adjustment to align the closest notch with the pin 26.

Although in the illustrated embodiment, the shank is shown as mounting a shovel, it will be understood that the shank could also mount a conventional disc hiller. In FIG. 1 the pipe 10 is shown as carrying a guide roll 40. The latter has an axle 42 on which the roll rotates and a support arm 44 which may be suitably secured to the pipe 10 by a clamp or the like. Although, the pipe is shown as carrying only one casting 12 and bar 20, it will be understood that it may carry any number thereof extending from both sides of the pipe 10. There may, in turn, be a plurality of spaced pipes suitably affixed to a tractor, all such pipes being substantially parallel to one another and extending parallel to the straight line path of travel of the tractor.

It will be seen that with the above construction it is a relatively simple matter to adjust the spacing of the shanks merely be initially pulling a pin, holding it out until the bar position is changed, and then, releasing the pin so that the spring will urge it into position to lock the bar in its new position. This is in contrast to known arrangements wherein there are bolts and in some cases four sets of screws holding the shank to the bar, all of which have to be initially loosened and subsequently tightened to effect the adjustment.

It is thought that the invention and many of its attendant advantages will be understood from the foregoing description and it will be apparent that various changes may be made in the form, construction and arrangement of the parts without departing from the spirit and scope of the invention, the form hereinbefore described being merely a preferred embodiment thereof.

What I claim is:

1. Apparatus for use on a cultivator, comprising a support means in the form of an elongated pipe or the like, a support clamp affixed to said pipe, said support clamp having a downwardly depending section provided with an opening, a pin, said support clamp having pin mounting means for mounting said pin on said clamp, an elongated bar slidably mounted in said opening and having its longitudinal axis disposed transverse to the longitudinal axis of said elongated pipe, an earth working element mounted on said bar, said bar having a plurality of spaced indentations, said pin-mounting means mounting said pin for reciprocal movement across a portion of said opening between a locked and nonlocked position whereby in said locked position, said pin engages one of said indentations in said bar to lock the latter in a fixed position and in said nonlocked position, said pin is free of said bar and the latter may be slid longitudinally relative to the support clamp to adjust the position of said elongated bar and the earth working implement mounted thereon, said pin mounting means including a coil spring in said support clamp normally biasing said pin into said locked position.

2. Apparatus according to claim 1, wherein said opening and bar are of complementing square cross-sectional shape.

3. Apparatus according to claim 2 wherein said pin and opening have their axes disposed at right angles to the longitudinal axis of said bar.

4. Apparatus for use on a cultivator, comprising a support means in the form of an elongated pipe or the like, a support clamp affixed to said pipe, said support clamp having a downwardly depending section provided with an opening, a pin, said support clamp having pin mounting means for mounting said pin on said clamp, an elongated bar slidably mounted in said opening and having its longitudinal axis disposed transverse to the longitudinal axis of said elongated pipe, an earth working element mounted on said bar, said bar having a plurality of spaced indentations, said pin mounting means mounting said pin for reciprocal movement between a locked and nonlocked position whereby in said locked position, said pin engages one of said indentations in said bar to lock the latter in a fixed position and in said nonlocked position, said pin is free of said bar and the latter may be slid longitudinally relative to the support clamp to adjust the position of said elongated bar and the earth working implement mounted thereon, said bar having a square, cross-sectional configuration with two of the opposing right angle corners being disposed vertically one above the other, said bottom right angled corner having said indentations therein in the form of notches.

5. Apparatus according to claim 4, wherein said notches are semicircular having a diameter substantially equal to the diameter of said pin.